United States Patent
Natanzon et al.

(10) Patent No.: US 11,003,538 B2
(45) Date of Patent: May 11, 2021

(54) AUTOMATICALLY CONFIGURING BOOT ORDER IN RECOVERY OPERATIONS

(71) Applicant: EMC IP Holding Company LLC, Hopkinton, MA (US)

(72) Inventors: Assaf Natanzon, Tel Aviv (IL); David Zlotnick, Tel Aviv (IL); Boris Shpilyuck, Ashdod (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 83 days.

(21) Appl. No.: 16/249,958

(22) Filed: Jan. 17, 2019

(65) Prior Publication Data
US 2020/0233674 A1    Jul. 23, 2020

(51) Int. Cl.
| | |
|---|---|
| *G06F 9/455* | (2018.01) |
| *G06F 11/14* | (2006.01) |
| *G06F 9/4401* | (2018.01) |
| *G06F 11/30* | (2006.01) |
| *G06F 11/20* | (2006.01) |

(52) U.S. Cl.
CPC ........ *G06F 11/1417* (2013.01); *G06F 9/4401* (2013.01); *G06F 9/455* (2013.01); *G06F 11/301* (2013.01); *G06F 9/45558* (2013.01); *G06F 11/2028* (2013.01); *G06F 2009/45575* (2013.01); *G06F 2201/815* (2013.01); *G06F 2201/82* (2013.01)

(58) Field of Classification Search
CPC ............. G06F 9/45558; G06F 11/2046; G06F 11/1484; G06F 11/1438; G06F 9/45533; G06F 11/3419; G06F 9/4401; G06F 9/455; G06F 11/1417
See application file for complete search history.

(56) References Cited

U.S. PATENT DOCUMENTS

| | | | | |
|---|---|---|---|---|
| 9,778,944 | B1 * | 10/2017 | Madasamy | G06F 9/45533 |
| 2008/0189468 | A1 * | 8/2008 | Schmidt | G06F 11/2046 |
| | | | | 711/6 |
| 2015/0178118 | A1 * | 6/2015 | Morariu | G06F 9/45558 |
| | | | | 718/1 |
| 2016/0085636 | A1 * | 3/2016 | Dornemann | G06F 9/45558 |
| | | | | 707/679 |
| 2017/0168903 | A1 * | 6/2017 | Dornemann | G06F 9/45558 |
| 2017/0199795 | A1 * | 7/2017 | Allen | G06F 11/1438 |
| 2018/0067827 | A1 * | 3/2018 | Gallagher | G06F 11/1484 |
| 2019/0073276 | A1 * | 3/2019 | Yuen | G06F 11/3419 |

* cited by examiner

*Primary Examiner* — Tuan A Vu
(74) *Attorney, Agent, or Firm* — Workman Nydegger (57) ABSTRACT

Systems and methods for automatically generating a boot sequence. A multiple virtual machine computing environment is analyzed to generate a boot sequence that is used during a recovery operation. The boot sequence may be based on applications and application types running on the virtual machines, a network configuration and network traffic, and on manual boots of virtual machines. The boot sequence prioritizes the order in which the virtual machines are booted in the recovery site.

20 Claims, 5 Drawing Sheets

AUTOMATICALLY CONFIGURING BOOT ORDER IN RECOVERY OPERATIONS

FIELD OF THE INVENTION

Embodiments of the present invention relate to systems and methods for protecting data. More particularly, embodiments of the invention relate to systems and methods for recovering data in a computing environment and more specifically to systems and methods for automatically configuring a boot order of virtual machines during a recovery operation.

BACKGROUND

Today, most entities and organizations use computer technologies when conducting operations. There are times, however, when problems arise with their computers. As a result, sensible organizations plan for potential problems by implementing systems that allow for recovery.

For example, disaster recovery (DR) is often a critical process for organizations and is required to guarantee business continuity. However, disaster recovery is a very complex process and is error prone. There are many steps to consider when forming a disaster recovery plan, one of which relates to booting virtual machines that may be used in the computing system. This problem is rooted in computing technology and is conventionally resolved manually. This proves difficult and, as previously stated, is error prone. As a result, the boot order of the virtual machines may actually impede or complicate the recovery operation.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to a data protection system and to systems and methods for automatically performing recovery operations and in particular to automatically determining a boot order of virtual machines in a multiple virtual machine environment. Embodiments of the invention advantageously simply recovery plans, particularly for environments that include a large number of virtual machines. By automatically configuring the boot order and having a plan for the recovery operation, the setup process becomes faster and easier and is less subject to manual errors. Manual labor is saved and the continuity (e.g., business continuity) risks are reduces. In addition, embodiments improve the recovery operation and the operation of the computing environment at least because errors are reduced. Automatically configuring the boot order to the virtual machines improves the speed of the recovery operation.

Examples of data protection operations include, but are not limited to, backup operations, recovery operations, deduplication operations, replication operations, boot configuration operations, or the like or combination thereof.

In one example, the data protection system that performs data protection operations may include a recommendation engine that is configured to automatically determine a boot sequence of virtual machines in multiple virtual machine environments. In one example, the recommendation engine may determine a boot priority for each of the virtual machines. Some of the virtual machines may have the same priority.

The recommendation engine may propose a boot sequence based on one or more parameters. The recommendation engine can continually evaluate the parameters and, if necessary, adjust the boot sequence. This may also be done on command or in response to changes in the computing environment. For example, the adding virtual machines, removing virtual machines, reconfiguring virtual machines, upgrading virtual machines, or the like are examples of events that may result in the boot order being reevaluated.

In one example, a user such as an authorized administrator may be able to review the boot sequence or order generated by the recommendation engine and make changes if desired. However, the boot sequence or order proposed by the recommendation engine will produce a boot order that results in a successful recovery operation. The recommendation engine may also be configure to learn from actions taken in the environment. Thus, if an administrator makes changes, the change is noted and incorporated into the process of generating a boot sequence. In addition, the administrator may be prompted to provide information relating to the change in the boot sequence. Thus, the recommendation engine may include machine learning capabilities.

The parameters may be predetermined and/or may be based on an analysis of the computing environment. The parameters may include, but are not limited to, types of applications running on the virtual machines, network configuration and network traffic, and monitoring the order in which the virtual machines are booted, for example, during maintenance operations. These parameters can be used to automatically determine a boot sequence for the virtual machines in the computing environment during a boot operations. Further, the recommendation engine (or other portion or component of the data protection system) may periodically check to see if any changes are warranted. These changes can be implemented automatically or are subject to user review and approval.

Figure 1:
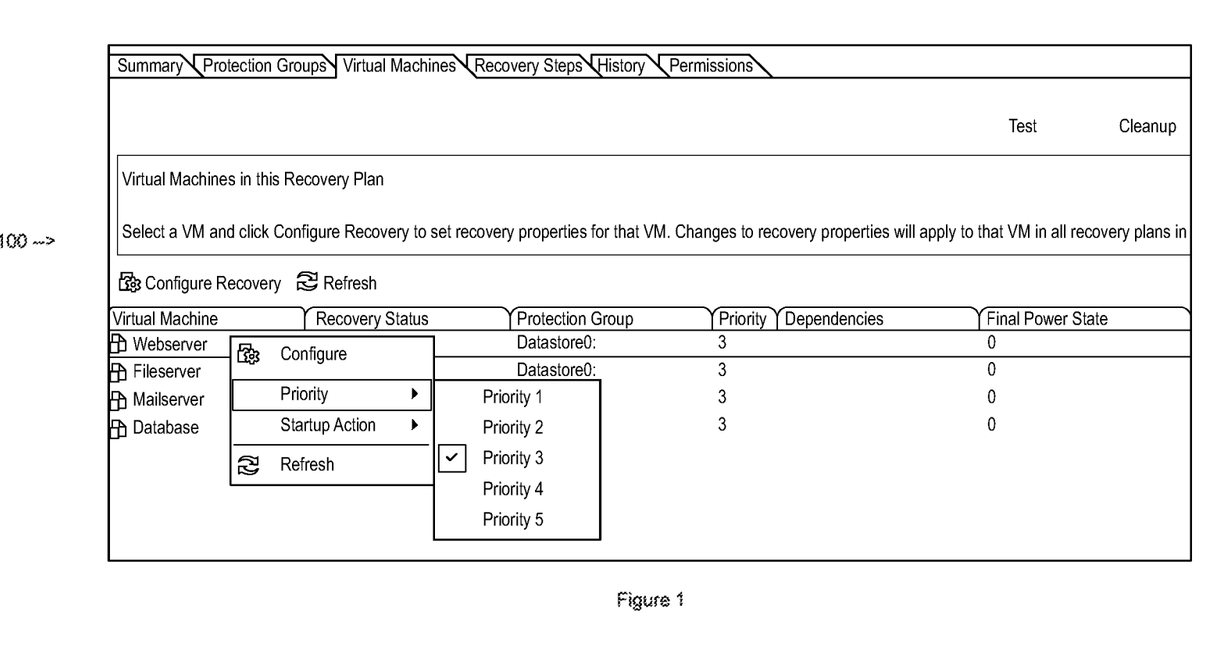
FIG. 1 illustrates an example of virtual machines and their priorities in for a recovery plan.

FIG. 1 illustrates an example of a user interface associated with a boot sequence of virtual machines in a computing environment. The user interface 100 is an example of a user interface that illustrates how the recommendation engine has assigned priorities to the virtual machines. FIG. 1 also illustrates the ability of an administrator to change the priority of the virtual machines. In this example, all of the virtual machines have the same priority. However, the recommendation engine may give different priorities to different machines. For example, the fileserver virtual machine may be given a priority of (1) such that the fileserver virtual machine boots before any of the other virtual machines. Thus, the virtual machines can have the same priorities, different priorities, or a combination thereof.

In another example, the priorities may be configured such that the virtual machines boot in a timed sequence in accordance with the priority. For example, virtual machines with a priority of (1) will boot before virtual machines with a priority of (2). However, the virtual machines with a priority of (2) may boot after the virtual machines with a priority of (1) finish booting or prior to finishing booting.

Figure 2:
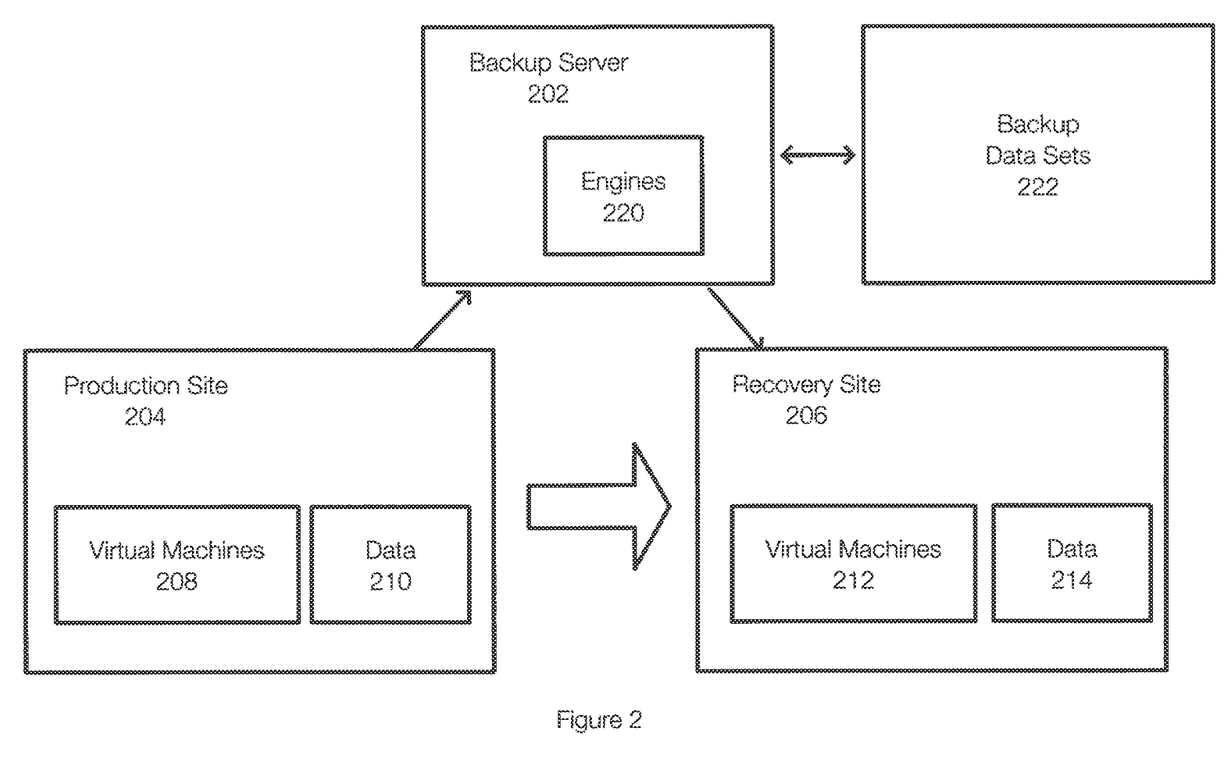
FIG. 2 illustrates and example of a system in which a recovery plan is implemented.

FIG. 2 illustrates an example of a data protection system in which data protection operations are performed. FIG. 2 illustrates a production site 204 that includes multiple virtual machines 208 operating in a computing environment. The virtual machines 208 may be associated with data 210. The backup server 202 includes engines 220 that are configured to perform various actions. For example, a recommendation engine is configured to determine a recommended boot sequence for the virtual machines 208. The engines 220 may communicate with agents operating on or in the virtual machines 208. An agent is not required on each of the virtual machines and, in some embodiments, no agent is required. Further, the agent may be independent of the virtual machines (e.g., have its own IP address).

In this example, a backup server 202 may backup data 210 and store the backed up data in the backup data sets 222. During a recovery operation, the backup server 220 may operate to recover or restore the production site 204 to a recovery site 206. The production site 204 and the recovery site 206 may be in the same computing environment (e.g., a local network, a data center). The backup server 202 may also operate in the local network or in the cloud.

During the recovery operation, the data 214 may be restored from the backup data sets 222 if necessary. Alternatively, if it is only necessary to restore the virtual machines 212, the virtual machines 212 may be recovered or started based on the recommended boot sequence. The virtual machines 212 may use the data 214, which may be the same as the data 210. In one example, the recovery site 206 (once restored) can serve as the production site.

Figure 3:
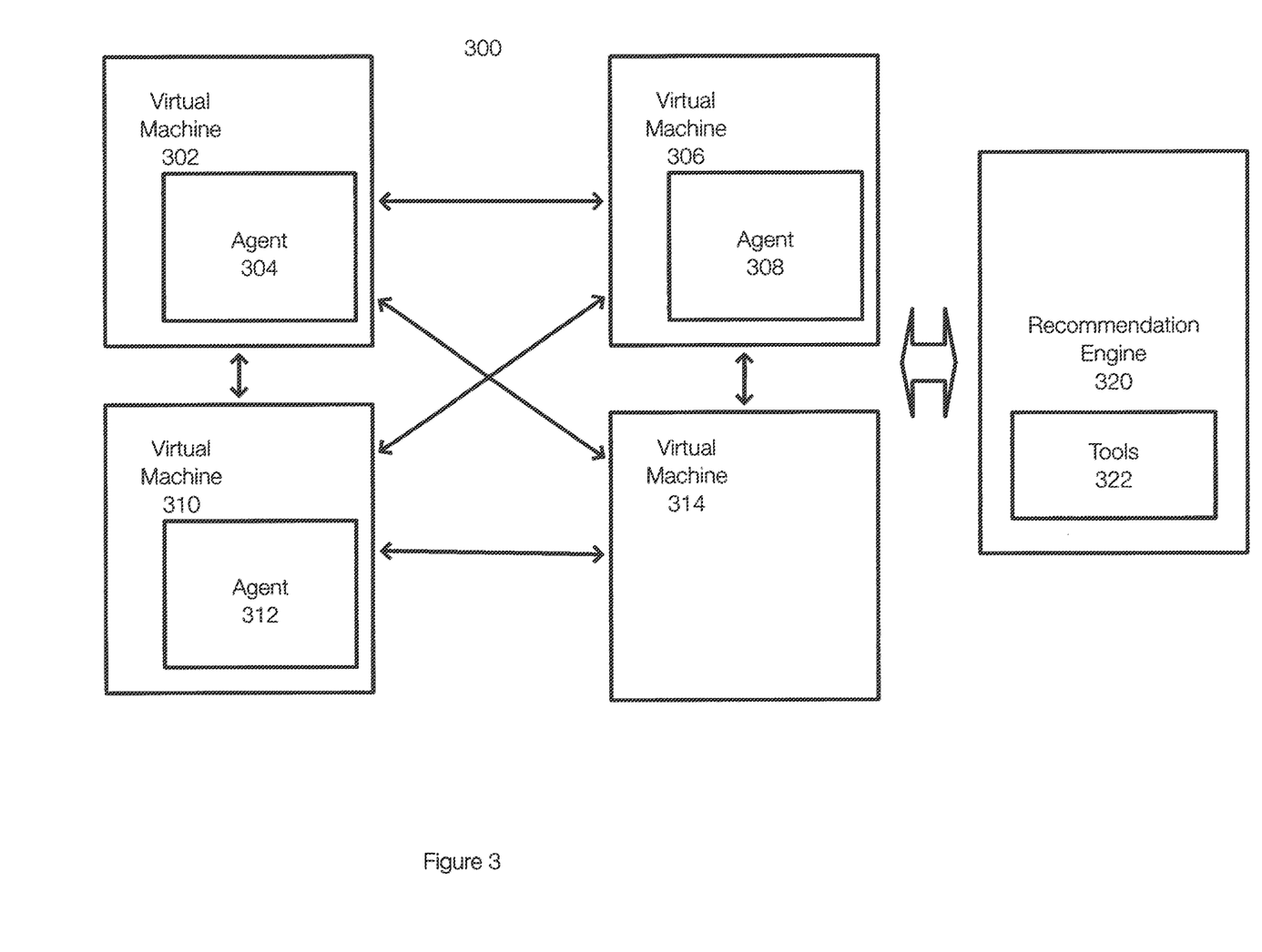
FIG. 3 illustrates an example of virtual machines in a production site and illustrates examples of relationships between the virtual machines.

FIG. 3 illustrates an example of a computing environment that includes multiple virtual machines. FIG. 3 illustrates virtual machines 302, 306, 310 and 314. In this example, the virtual machines 302, 3065 and 310 are each associated, respectively, with agents 304, 308 and 312. The virtual machine 314 may not be associated with an agent. These agents may cooperate with the backup server or with one or more engines during various data protection operations. The agents can aid in determining the parameters used to generate a boot sequence in addition to other aspects of data protection operations.

In one example, the computing environment and the virtual machines running therein are examined or analyzed by a recommendation engine 322. The recommendation engine 322 may determine the types of applications operating on the various virtual machines or determine the virtual machines associated with various applications. For example, the recommendation engine 322 may determine that the virtual machine 302 may be a webserver, the virtual machine 306 may be a fileserver, the virtual machine 310 may be a mail server and the virtual machine 314 may be a database. These applications may include or use more than one virtual machine.

The recommendation engine 322 may include or have access to tools 322 that further allow the network 300 to be analyzed and to detect applications and other network activity. This allows network communications (and directions (e.g., sending, receiving) to be determined and including in the determination of the boot sequence.

For example, the recommendation engine 322 first obtain information may identify those virtual machines that expose a storage service such as a file system (e.g., a file server). The recommendation engine 322 may determine which virtual machines include or are associated with a database (e.g., a database or a database server). The recommendation engine 322 may determine which virtual machines are exposed to end users or that provide user interfaces or that perform other tasks. These information, which are examples of parameters used in determining the boot sequence, can be determined by the recommendation engine 320 in conjunction with the agents 308 or not. Further, the network communications in the network 300 can be evaluated by reviewing the packets sent on the network. In addition, the recommendation engine 320 may be able to issue queries for certain information to the virtual machines.

In one example, the agents 304, 308, and 312 can review the processes running on the virtual machines. The names of processes may help in identifying the functions of the virtual machine and the associated applications. The number of incoming connections or connection request may aid in determining the application type (e.g., a database may receive connections). Packets may be evaluated to determine applications. For example, a query to a database may help identify a client machine and a database machine. Traffic coming into or going out of a virtual machine also characterizes the virtual machine.

Even in cases where the application cannot be identified, these other factors, connections, traffic rates, and the like can aid in determining the boot sequence. A virtual machine that supports many connections, for example, should be booted before the virtual machines that are requesting to connect.

In one example, the boot sequence can be determined based on the detected applications. Virtual machines that expose a storage service such as a file system, for example, may boot first. Virtual machines that are databases may boot after virtual machines that expose a storage service. Virtual machines that are exposed to users may boot last. This information can be used to assign priorities to the virtual machines and determine the boot order.

Another parameter includes network configuration and traffic. This parameter may uses VLAN configurations, the traffic between the virtual machines, which virtual machines initiate communications, and the like [for example virtual machine which initiates connections probably assumes the target VM is up so it should go up later]. Analyzing this type of information can, for example, identify dependencies between virtual machines. For example, the fact that one virtual machine is a database client and another virtual machine is a database can be inferred from which virtual machine initiates a connection, the traffic between the virtual machines, and the like. This also illustrates that the database client is dependent on the database. When determining the boot sequence, the database should be booted before the database client. Otherwise, the database client may fail or experience problems during boot up because of the inability to find or connect to the database.

Another parameter used in determining a boot sequence relates to maintenance operations or other operations that may be performed in the system. When operations require virtual machines to be taken down and rebooted, this sequence can be detected and remembered by the recommendation engine. In other words, the order in which a user boots virtual machines (even if this affects fewer than all of the virtual machines in the system) can give an indication as to the correct boot order configuration. For example, virtual machines associated with a mail server may be subject to a maintenance operation. The order in which the virtual machines related to the mail application are shut down and restarted can be incorporated into the analysis of determining a boot sequence for all of the virtual machines in the event of a recovery (e.g., a disaster recovery).

In another example, an application is often not limited to a specific virtual machine. For example, an application may have client components, middle ware components, database components, and storage components (each of these components may involve different virtual machines). Booting in the wrong order may lead to problems in a recovery operation. Booting a database before the storage is available, for example, may be problematic. Booting a client, as previously stated, before the database is available may also cause problems. The recommendation engine 322 can evaluate and identify these relationships and application types such that a correct boot sequence or order can be determined.

Figure 4:
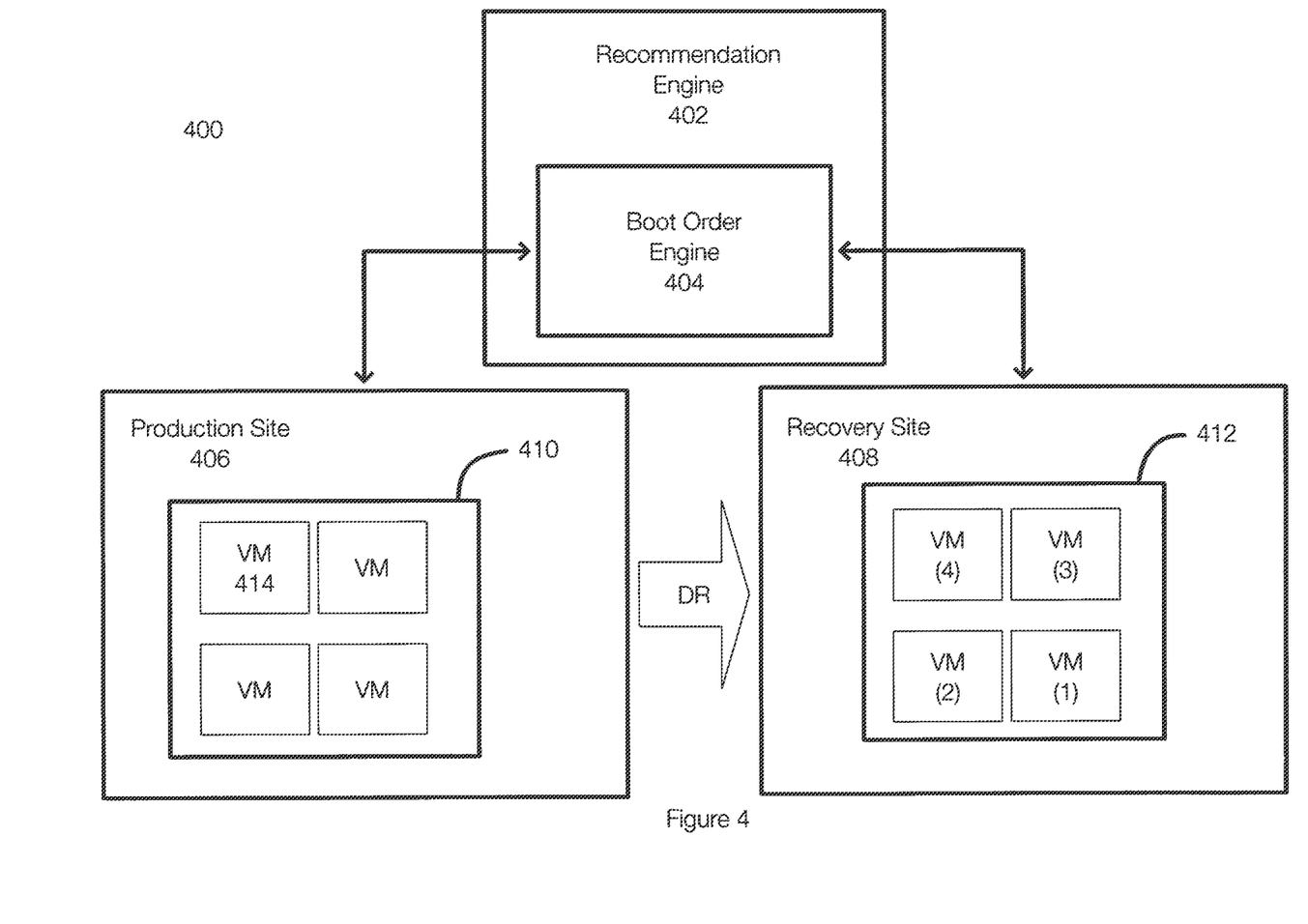
FIG. 4 illustrates another example of systems and methods performing a recovery operation.

FIG. 4 illustrates an example of a data protection system that includes a recommendation engine configured to determine or recommend a boot sequence in a computing environment that includes multiple virtual machines.

FIG. 4 illustrates a production site 406 that includes multiple virtual machines 410. The recommendation engine 402 may analyze or examine the production site 402 or the virtual machines 410 in order to determine a boot sequence or a boot order. Once the determined boot sequence is determined (and authorized if necessary by a user), the boot order engine 404 may implement the determined boot sequence in order to recover the virtual machines 410 as the virtual machines 418 at the recovery site 408. The virtual machines 412 each include a priority in parenthesis to identify the order in which the virtual machines 412 were booted during the recovery operation.

The recommendation engine may collect the parameters used in determining the boot sequence by evaluating each of the virtual machines in the virtual machines 410. For example, the recommendation engine may query the virtual machine 414 (or an agent operating thereon) to identify the processes running on the virtual machine 414. The names of the processes give an indication as to an application type. The recommendation engine 402 may evaluate the traffic coming to and going out from the virtual machine 414. A virtual machine that receives multiple incoming connections or queries may indicate an application type. This may also indicate dependencies amongst the virtual machines. Machines requesting to connect to the virtual machine 414 are dependent on the virtual machine 414. The virtual network settings can also be analyzed. The relationship of how the virtual machine 414 is shut down and restarted in the context of other virtual machines (for example during a maintenance operation) may also be remembered by the recommendation engine.

The virtual machines 412 indicate that they were booted in an order from (1) to (4). In this example, the virtual machine (1) may expose a storage service and is therefore booted first. The virtual machine (2) may be a database server and may be booted next. The virtual machine (3) may represent a machine that does not expose a service and does not interface with a user (a middle ware type machine) and is booted next. The virtual machine (4) may be a user exposed machine and will be booted last.

The number of virtual machines is not limited and, in another example, multiple virtual machines may boot at the same time, particularly if they have the same priority.

Figure 5:
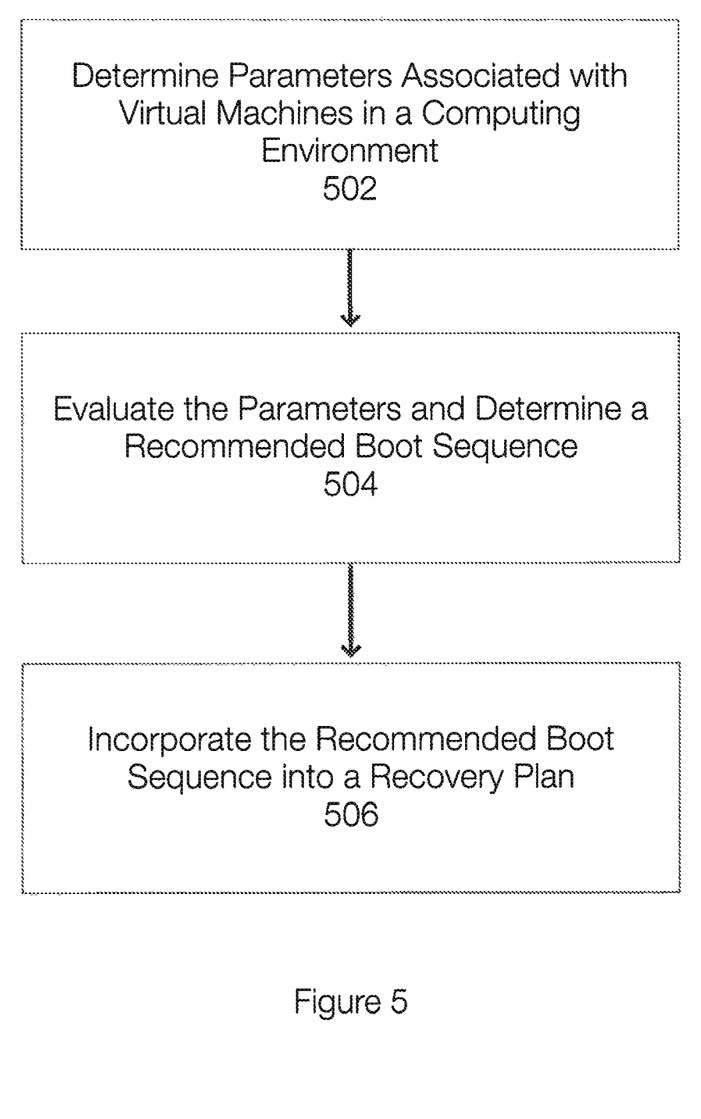
FIG. 5 illustrates an example of a method for performing a recovery operation.

FIG. 5 illustrates an example of a method for implementing and/or preparing a recovery plan that, if necessary, can be executed to recover the virtual machines running in the production computing environment. The method of FIG. 5 often begins by determining 502 parameters associated with the virtual machines running in the computing environment. Determining the parameters may include collecting information about applications running on the virtual machines, collecting information about network the networks and actions occurring in the network. These actions or events may include, but are not limited to, information about types of packets, content of packets, which virtual machines receiving incoming connections, which access storage devices, which interface with users, determining names of running processes, determining the number of connections, monitoring the order of shutdowns and boots during user performed operations such as maintenance operations, and the like or combination thereof.

The parameters are then evaluated 504 to determine a recommended boot sequence. The manner in which a priority is actually assigned to a virtual machine can be performed by giving each of the factors a weight and then summing the weights. The machines with the highest total may be given the highest priority. Further, these assignations can be determined from a relative perspective.

For example, for each factor, the virtual machines can be ranked. With regard to the number of incoming connections, all of the virtual machines may be given a relative rank on some scale (e.g., 1-10). Those with the highest number of incoming connections or those in a given range are assigned one value while those in other tiers are assigned other values. Virtual machines that interface with storage services may similarly be assigned values. The other factors can be treated in a similar manner. Then, the overall priorities can be assigned based on the sum (or a weighted sum) of these values and priorities can be assigned using tiers. Alternatively, some factors may be heavily weighted to ensure that the corresponding virtual machines have a high priority.

Once a boot sequence has been determined, the determined boot sequence can be included 506 into a recovery plan that is executed during a restore operation. In one example, the determined boot sequence may be subject to user review and adjustment.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining a boot sequence that determines an order in which virtual machines are booted in a computing environment, the method comprising:
   determining parameters associated with each of the virtual machines running in a production site, wherein determining parameters includes analyzing the computing environment to determine relationships and dependencies amongst the virtual machines, which includes:
      examining a number of incoming connections to determine an application type, wherein virtual machines receiving a higher number of the incoming connections are given a higher priority;
      determining which of the virtual machines initiate connections and which of the virtual machines are targets of the connections, wherein the virtual machines that are the targets are given a higher priority;
      determining which of the virtual machines expose a storage service, wherein virtual machines that expose the storage service are given a higher priority than virtual machines that access the storage service;
      determining which of the virtual machines are exposed to users, wherein the virtual machines exposed to users are given a lower priority;
   generating a priority for each of the virtual machines in the computing environment based on the parameters;
   generating the boot sequence based on the priorities of the virtual machines; and
   incorporating the boot sequence into a recovery plan, wherein incorporating the boot sequence includes adjusting an existing boot sequence when present based on the generated boot sequence.

2. The method of claim 1, further comprising booting the virtual machines in a recovery site in accordance with the boot sequence.

3. The method of claim 1, wherein determining parameters includes determining types of applications running on the virtual machines.

4. The method of claim 3, further comprising analyzing a network configuration of the virtual machines and network traffic associated with the virtual machines.

5. The method of claim 4, further comprising monitoring an order in which at least some of the virtual machines are booted during a user operation.

6. The method of claim 1, wherein determining parameters further comprises analyzing factors, the factors including one or more of: types of packets, content of packets, which virtual machines access storage services, names of running processes on the virtual machines, number of connections, and/or an order of shutdowns and boots during user performed operations.

7. The method of claim 1, further comprising adjusting the boot sequence periodically or in response to an event in the environment.

8. The method of claim 1, wherein generating a priority includes:
   assigning a first priority to virtual machines that expose storage service;
   assigning a second priority to virtual machines that are databases;
   assigning a third priority to virtual machines that are exposed to the users, wherein the first priority is higher than the second priority and the second priority is higher than the third priority.

9. The method of claim 1, wherein more than one of the virtual machines has the same priority such that at least a portion of the virtual machines will boot at the same time.

10. A non-transitory computer readable medium comprising computer executable instructions for implementing the method of claim 1.

11. A method for generating a boot sequence that determine an order in which virtual machines are booted during a recovery operation, the method comprising:
    determining an application type for each of the virtual machines operating in the computing environment;
    analyzing the virtual machines to determine relationships and dependencies amongst the virtual machines, which includes:
        analyzing a network configuration and network traffic associated with the virtual machines;
        examining a number of incoming connections to determine an application type, wherein virtual machines receiving a higher number of the incoming connections are given a higher priority;
        determining which of the virtual machines initiate connections and which of the virtual machines are targets of the connections, wherein the virtual machines that are the targets are given a higher priority;
        determining which of the virtual machines expose a storage service, wherein virtual machines that expose the storage service are given a higher priority than virtual machines that access the storage service;
        determining which of the virtual machines are exposed to users, wherein the virtual machines exposed to users are given a lower priority;
    determining the boot sequence based on at least one of the application type, the network configuration, the relationships and dependencies, and the network traffic; and
    formulating the recovery plan to include the boot sequence.

12. The method of claim 11, further comprising monitoring manual restarts of virtual machines in the computing environment, where the boot sequence also accounts for the manual restarts, wherein the manual restarts indicates a boot order at least for the virtual machines associated with the manual restarts.

13. The method of claim 11, further comprising determining additional parameters including one or more of: types of packets, content of packets, which virtual machines receive incoming connections and a number of incoming connections, which virtual machines access storage services, which virtual machines interface with users, names of running processes on the virtual machines, number of connections, and/or an order of shutdowns and boots during user performed operations.

14. The method of claim 13, wherein the boot sequence accounts for the additional parameters.

15. The method of claim 11, wherein generating a priority includes:
    assigning a first priority to virtual machines that expose a storage service;
    assigning a second priority to virtual machines that are databases;
    assigning a third priority to virtual machines that are user exposed virtual machines,
    wherein the first priority is higher than the second priority and the second priority is higher than the third priority.

16. The method of claim 11, wherein more than one of the virtual machines has the same priority such that at least a portion of the virtual machines will boot at the same time.

17. The method of claim 11, further comprising adjusting the boot sequence.

18. The method of claim 11, further comprising submitting the boot sequence for user approval.

19. A non-transitory computer readable medium comprising computer executable instructions for implementing the method of claim 11.

20. A system for performing a data protection operation, the system comprising:
    a backup server including a processor and memory, the backup server including a recommendation engine configured to generate a recommended boot sequence;
    an agent operating on one or more virtual machines operating in a computer environment,
    wherein the agent and the recommendation engine are configured to generate the boot sequence by:
        determining an application type for each of the virtual machines operating in a computing environment;
        analyzing the virtual machines to determine relationships and dependencies amongst the virtual machines which includes:
            analyzing a network configuration and network traffic associated with the virtual machines;
            examining a number of incoming connections to determine an application type, wherein virtual machines receiving a higher number of the incoming connections are given a higher priority;
            determining which of the virtual machines initiate connections and which of the virtual machines are targets of the connections wherein the virtual machines that are the targets are given a higher priority;
            determining which of the virtual machines expose a storage service, wherein virtual machines that expose the storage service are given a higher priority than virtual machines that access the storage service;
            determining which of the virtual machines are exposed to users, wherein the virtual machines exposed to users are given a lower priority;
        monitoring manual restarts of virtual machines in the computing environment
        determining the boot sequence based on at least one of the application type, the network configuration, the relationships and dependencies, and the network traffic and the manual restarts; and
        formulating the recovery plan to include the boot sequence.

* * * * *